US010618605B2

(12) United States Patent
Yuck et al.

(10) Patent No.: US 10,618,605 B2
(45) Date of Patent: Apr. 14, 2020

(54) SEMI-SUBMERSIBLE MARITIME STRUCTURE

(71) Applicant: SAMSUNG HEAVY IND. CO., LTD., Seoul (KR)

(72) Inventors: Rae Hyoung Yuck, Geoje-si (KR); Hyun Jo Kim, Geoje-si (KR); Sam Kwon Hong, Geoje-si (KR); Seung Jun Kim, Geoje-si (KR)

(73) Assignee: SAMSUNG HEAVY IND. CO., LTD., Seoul (KR)

( * ) Notice: Subject to any disclaimer, the term of this patent is extended or adjusted under 35 U.S.C. 154(b) by 294 days.

(21) Appl. No.: 15/559,382

(22) PCT Filed: Feb. 16, 2016

(86) PCT No.: PCT/KR2016/001542
§ 371 (c)(1),
(2) Date: Sep. 18, 2017

(87) PCT Pub. No.: WO2016/148403
PCT Pub. Date: Sep. 22, 2016

(65) Prior Publication Data
US 2018/0065713 A1 Mar. 8, 2018

(30) Foreign Application Priority Data

Mar. 19, 2015 (KR) .......... 10-2015-0038436
Jan. 25, 2016 (KR) .......... 10-2016-0008591

(51) Int. Cl.
B63B 21/50 (2006.01)
B63B 35/44 (2006.01)
(Continued)

(52) U.S. Cl.
CPC ............ *B63B 21/50* (2013.01); *B63B 17/00* (2013.01); *B63B 21/502* (2013.01); *B63B 35/44* (2013.01);
(Continued)

(58) Field of Classification Search
CPC . B63B 21/50; B63B 21/502; B63B 2021/505; B63B 35/44; B63B 35/4413;
(Continued)

(56) References Cited

U.S. PATENT DOCUMENTS 2,972,973 A * 2/1961 Thearle ................ B63B 21/502
114/264
3,577,946 A * 5/1971 Horton ................. B63B 21/502
114/265

(Continued)

FOREIGN PATENT DOCUMENTS

JP H09-202291 A 8/1997
KR 10-2011-0026147 A 3/2011
(Continued)

OTHER PUBLICATIONS

International Search Report dated May 13, 2016 in International Application No. PCT/KR2016/001542, filed Feb. 16, 2017.

*Primary Examiner* — Benjamin F Fiorello
*Assistant Examiner* — Stacy N Lawson
(74) *Attorney, Agent, or Firm* — Knobbe Martens Olson & Bear LLP

(57) ABSTRACT

A semi-submersible marine structure is described. The structure includes a hull including a pontoon, a deck disposed above the pontoon, and a plurality of columns supporting the deck from the pontoon. The structure also includes a plurality of tendons supporting the hull from a seabed. The pontoon has the shape of a circular ring, and the plurality of
(Continued)

tendons are arranged at regular intervals along an external circumferential surface of the pontoon.

8 Claims, 9 Drawing Sheets

(51) Int. Cl.
- *G01L 5/04* (2006.01)
- *B63B 17/00* (2006.01)
- *B63B 1/04* (2006.01)

(52) U.S. Cl.
CPC ............ *B63B 35/4413* (2013.01); *G01L 5/04* (2013.01); *B63B 2001/044* (2013.01); *B63B 2241/06* (2013.01); *B63B 2241/08* (2013.01)

(58) Field of Classification Search
CPC . B63B 9/065; B63B 2001/44; B63B 2241/06; B63B 2241/08
See application file for complete search history.

(56) References Cited

U.S. PATENT DOCUMENTS

| | | | | | |
|---|---|---|---|---|---|
| 3,919,957 | A | * | 11/1975 | Ray | ........................ B63B 21/502 114/265 |
| 3,986,471 | A | * | 10/1976 | Haselton | .............. B63B 35/4413 114/265 |
| 5,054,963 | A | * | 10/1991 | Williamsson | ......... B63B 21/502 405/203 |
| 5,197,825 | A | * | 3/1993 | Rasmussen | ............ B63B 21/502 405/205 |
| 2007/0212170 | A1 | | 9/2007 | Hawley | |
| 2013/0000540 | A1 | * | 1/2013 | Rijken | ................... B63B 21/502 114/265 |
| 2013/0000541 | A1 | * | 1/2013 | Rijken | ................... B63B 21/502 114/265 |

FOREIGN PATENT DOCUMENTS

| | | | |
|---|---|---|---|
| KR | 10-2011-0026148 A | | 3/2011 |
| KR | 20110026147 A | * | 3/2011 |
| KR | 10-2012-0074095 A | | 7/2012 |

\* cited by examiner

SEMI-SUBMERSIBLE MARITIME STRUCTURE

RELATED APPLICATIONS

This application is a U.S. national phase application of PCT/KR2016/001542 filed Feb. 16, 2016 that claims the benefit of Korean Patent Application No. 10-2015-0038436 filed Mar. 19, 2015, and Korean Patent Application No. 10-2016-0008591 filed Jan. 25, 2016, each of which is incorporated by reference herein in its entirety.

TECHNICAL FIELD

The present invention relates to a semi-submersible marine structure.

BACKGROUND

Tension leg platforms (TLP), which are semi-submersible marine structures, have been widely used recently in order to perform drilling or production in submarine oil or gas fields.

The conventional TLP is constituted with a hull, which is structured with pontoons and columns, and tendons for supporting the hull in the seabed.

As the drilling or production works are performed through a riser, which is extended from the hull to the seabed, it is imperative that the motion of the hull be minimized in order to provide stable working conditions.

Meanwhile, external disturbances such as tidal currents or waves affect the hull of the semi-submersible marine structure floating on the sea, causing the hull to move in the lateral direction. If the hull moves excessively in the lateral direction, it becomes difficult to perform the work because, for example, the riser is damaged.

There have been efforts recently for developing technologies for minimizing or readily controlling the motion cause by external disturbances.

SUMMARY

Embodiments of the present invention provide a semi-submersible marine structure that is affected less by external disturbances.

An aspect of the present invention provides a semi-submersible marine structure that includes: a hull including a pontoon, a deck disposed above the deck, and a plurality of columns supporting the deck from the pontoon; and a plurality of tendons supporting the hull from a seabed, wherein the plurality of tendons are arranged at regular intervals along an external circumferential surface of the pontoon.

A plurality of extension members, which are extended in a lateral direction and arranged symmetrically with one another, may be formed on the hull, and the plurality of tendons may be supported by the plurality of extension members, respectively, in such a way that the plurality of tendons are symmetrical with one another.

The semi-submersible marine structure may further include: a sensor part configured for measuring a fail of each of the tendons; a fail part configured to fail each of the tendons; and a control part configured to control an operation of the fail part based on a result of measuring by the sensor part.

When the control part determines that any one of the tendons has failed based on the result of measuring by the sensor part, the control part may instruct another tendon positioned opposite to the failed tendon to fail.

The sensor part may include a plurality of tension sensors configured to measure a tension of the tendons, respectively, and when a value measured by one of the plurality of tension sensor is smaller than a threshold, the control part may determine that the tendon corresponding to the tension sensor has failed.

The sensor part may further include a tilt sensor configured for measuring a trim angle or a heel angle of the hull, and when a value measured by the tilt sensor is greater than a threshold and a value measured by one of the plurality of tension sensors is smaller than a threshold, the control part may determine that the tendon corresponding to the tension sensor has failed.

The fail part may include a plurality of clamping devices configured for clamping the tendons, respectively, to the hull, and the control part may be configured to control clamping of the clamping devices based on the result of measuring by the sensor part.

When the control part determines that one of the tendons has failed based on the result of measuring by the sensor part, the control part may be configured to release clamping of the clamping device corresponding to another tendon positioned opposite to the failed tendon.

Each of the clamping devices may include a plurality of clamping units, and the control part may be configured to sequentially release clamping of the plurality of clamping units.

Each of the tendons may have a stopper formed thereon, and the stopper may be configured to prevent each of the tendons from being detached from a porch formed on the hull when clamping is released by the clamping device corresponding to the tendon.

DETAILED DESCRIPTION

Figure 1:
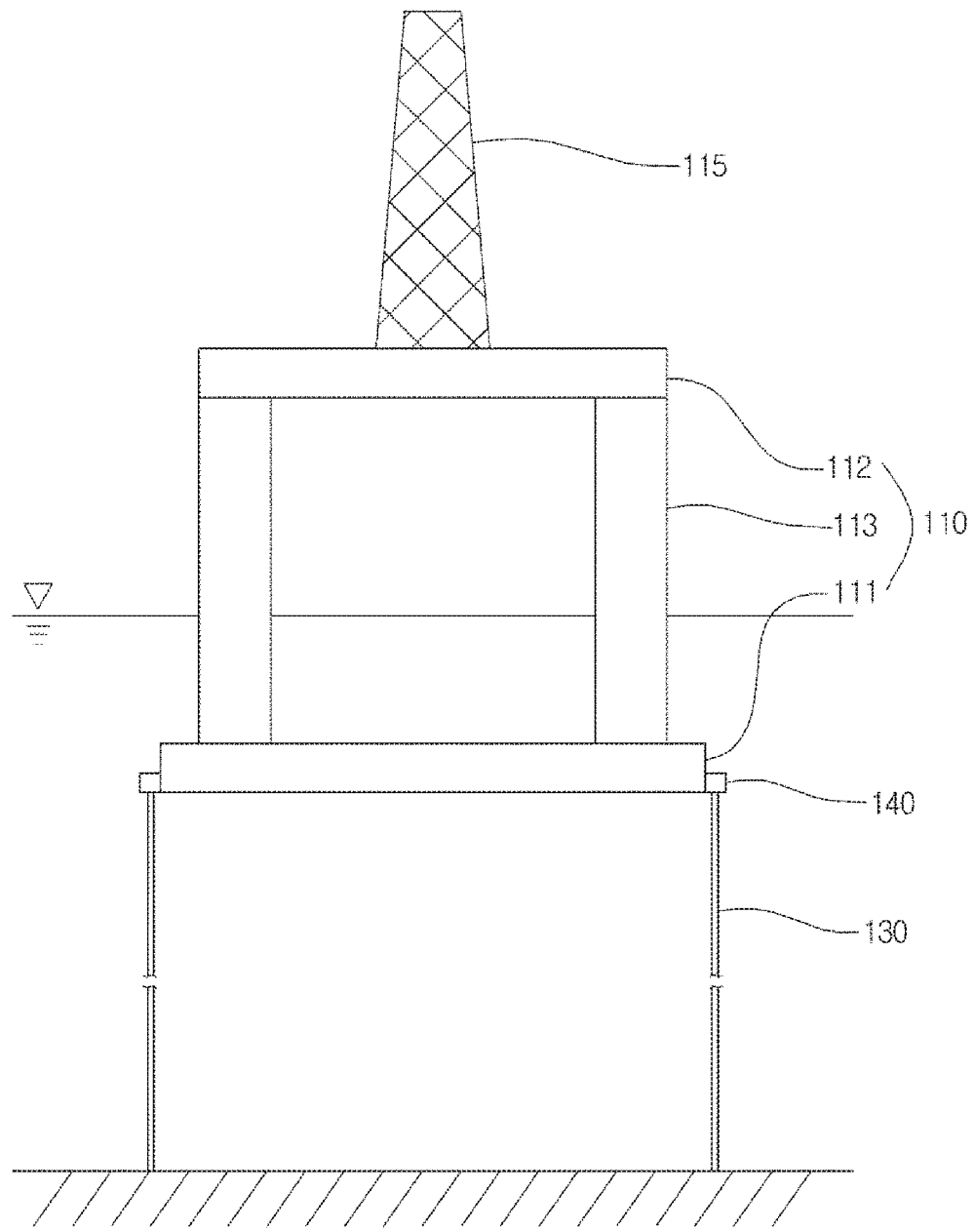
FIG. 1 is a side view of a semi-submersible marine structure in accordance with a first embodiment of the present invention.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the ideas and scope of the present invention. Throughout the description of the present invention, when describing a certain relevant conventional technology is determined to evade the point of the present invention, the pertinent detailed description will be omitted.

Hereinafter, some embodiments will be described in detail with reference to the accompanying drawings. Identical or corresponding elements will be given the same reference numerals, regardless of the figure number, and any redundant description of the identical or corresponding elements will not be repeated.

Figure 2:
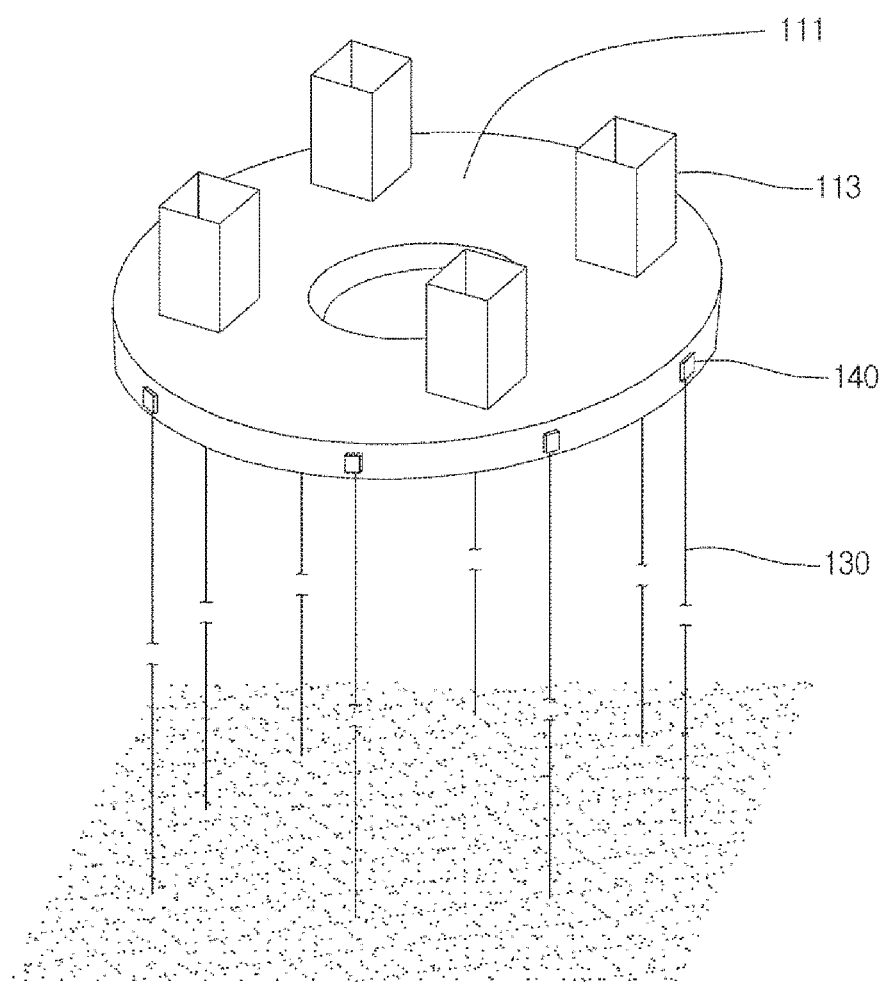
FIG. 2 is a perspective view of a portion of the semi-submersible marine structure in accordance with the first embodiment of the present invention.
Figure 3:
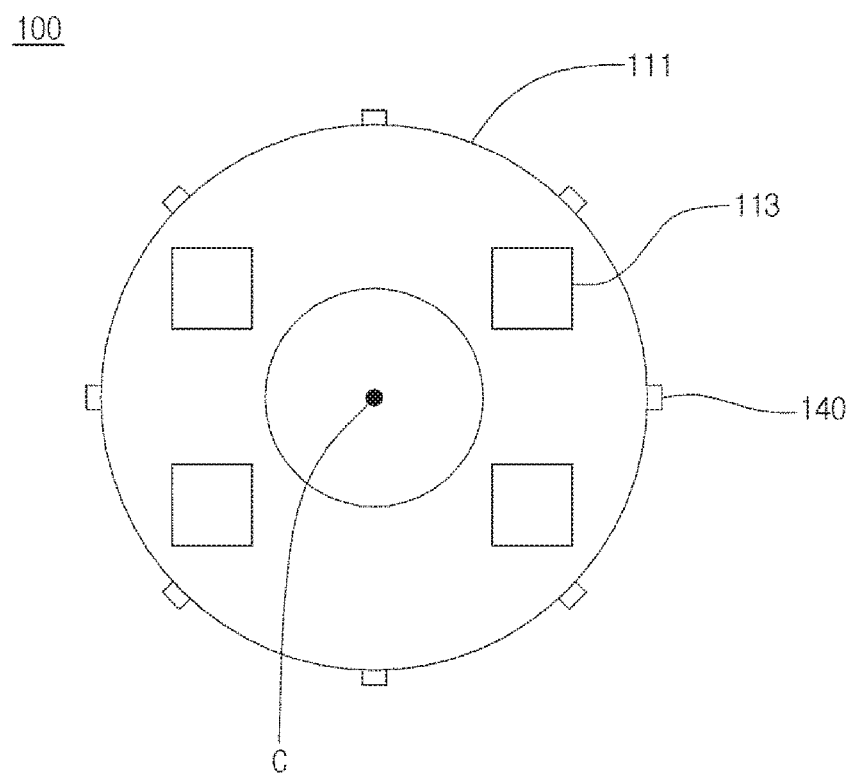
FIG. 3 is a top view of the portion of the semi-submersible marine structure in accordance with the first embodiment of the present invention.

FIG. 1 is a side view of a semi-submersible marine structure in accordance with a first embodiment of the present invention. FIG. 2 is a perspective view of a portion of the semi-submersible marine structure in accordance with the first embodiment of the present invention. FIG. 3 is a top view of the portion of the semi-submersible marine structure in accordance with the first embodiment of the present invention. Referring to FIG. 1 to FIG. 3, the semi-submersible marine structure 100 includes hull 110 and tendon 130. The semi-submersible marine structure 100 is configured for drilling or producing crude oil and/or gas in the sea.

The hull 110, which is a semi-submersible structure, includes pontoon 111, deck 112 and column 113.

The pontoon 111, which is a floating body, may be placed under the surface of the water. The pontoon 111 may have a ballast tank (not shown) formed therein to adjust its buoyancy.

In the present embodiment, the pontoon 111 has the shape of a circular ring. Accordingly, it is possible for the pontoon 111 to effectively disperse the load applied to the pontoon 111 by external disturbances in any directions, thereby effectively minimizing lateral movements of the hull 110. Moreover, since the pontoon 111 has consistent and predictable behaviors in response to the external disturbances in any directions, it is possible to readily control the position of the hull 110.

The deck 112 is placed above the water. The deck 112 has various instruments 115, such as drilling equipment or production equipment, mounted thereon.

The column 113 is interposed between the pontoon 111 and the deck 112. The column 113 interconnects the deck 112 and the pontoon 111 and supports the deck 112 from the pontoon 111. The column 113 may be provided in plurality.

The tendon 130 supports the hull 110 from the seabed (not shown). The hull 110 has a porch 140 formed thereon. The porch 140, which is structured to support the tendon 130, is formed on a surface of the hull 110. For example, the porch 140 may be formed on, but not limited to, on lateral surface of the pontoon 111.

The tendon 130 is provided in plurality.

In the present embodiment, the plurality of tendons 130 are supported to the hull 110 in such a way that the plurality of tendons 130 are symmetrical about a center C of the pontoon 111. In such a case, if any one of the plurality of tendons 130 fails, the tendon positioned opposite to the failed tendon may be controlled to fail as well to balance the position of the hull 100.

Here, that "a tendon 130 fails" refers to a condition in which the tension of the tendon 130 is zero but also a condition in which the tension of the tendon 130 is smaller than a minimum tension required for supporting the hull 110 form the seabed.

In the present embodiment, the tendon 130 may be provided in an even number. Here, there may be, but not limited to, 8 tendons 130, as shown in FIG. 2. The even number of tendons 130 are arranged at regular intervals along an external circumferential surface of the pontoon 111 having the circular-ring shape.

Owing to the above-described arrangement, the plurality of tendons 130 may be supported to the hull 110 in such a way that the plurality of tendons 130 are arranged symmetrically about the center C of the circular-ring-shaped pontoon 111. In such a case, if any one of the plurality of tendons 130 fails, the tendon positioned opposite to the failed tendon may be controlled to fail as well to balance the position of the hull 100.

Figure 4:
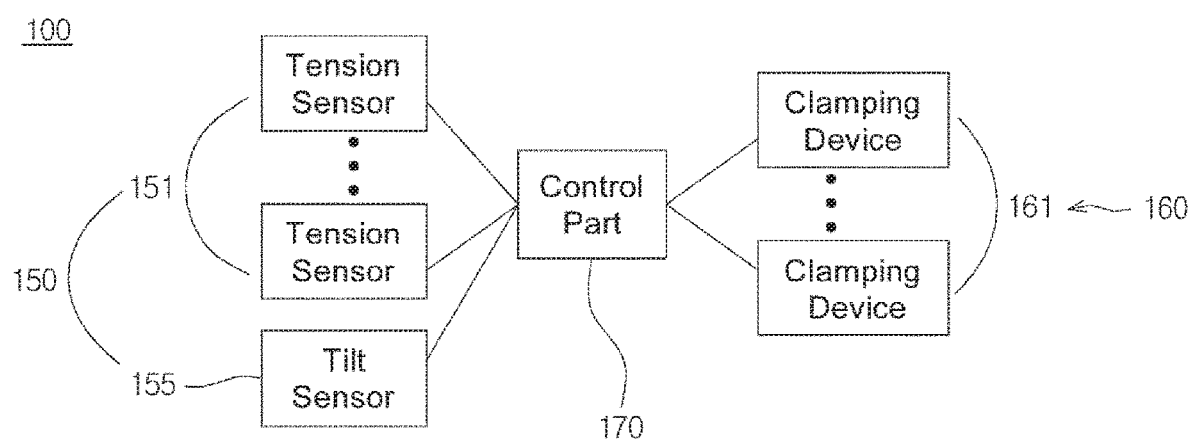
FIG. 4 shows an example of an operating system of the semi-submersible marine structure in accordance with the first embodiment of the present invention.
Figure 5:
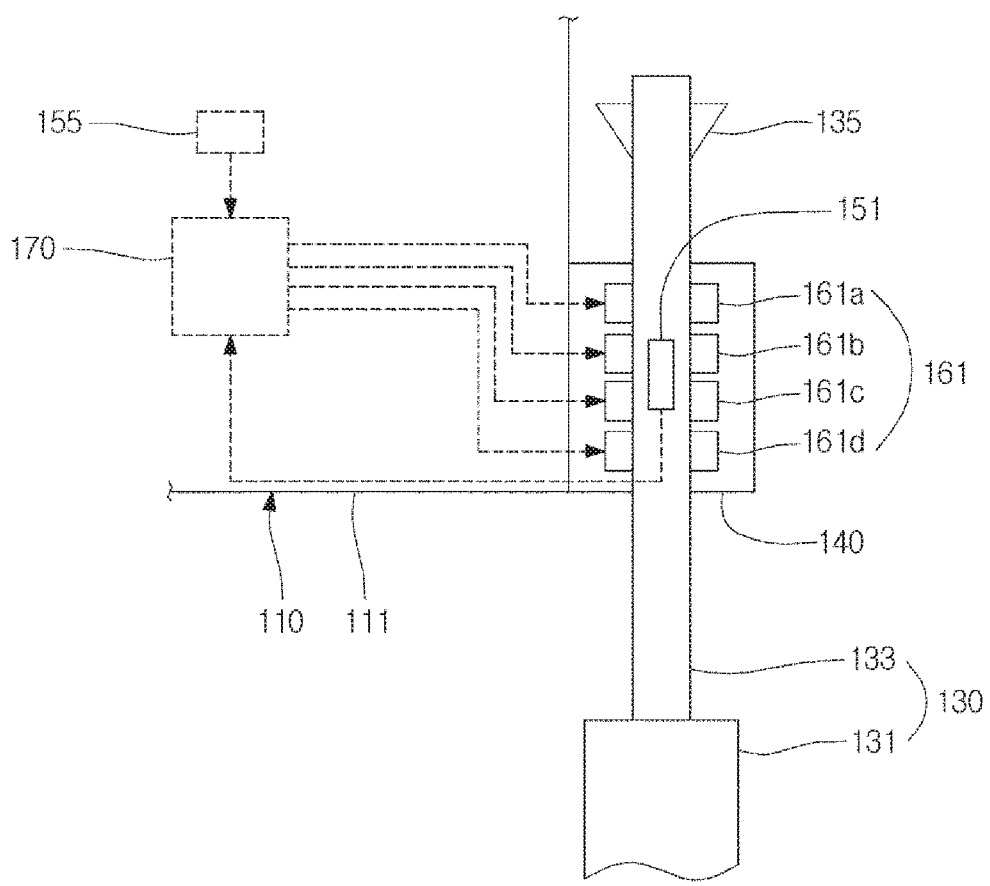
FIG. 5 shows an example of disposing the configuration shown in FIG. 4.

FIG. 4 shows an example of an operating system of the semi-submersible marine structure in accordance with the first embodiment of the present invention, and FIG. 5 shows an example of disposing the configuration shown in FIG. 4. Referring to FIG. 4 and FIG. 5, the semi-submersible marine structure may further include a sensor part 150, a fail part 16 and a control part 170.

The sensor part 150 may measure whether each of the tendons 130 has failed or not.

The sensor part 150 may include tension sensors 151, each of which is configured to measure the tension of each tendon 130. Values measured by the tension sensors 151 may be transmitted to the control part 170.

The fail part 160 allows a tendon 130 to fail. The fail part 160 may include fail devices, each of which is configured to fail each tendon 130.

The fail devices may each be a cutting device for cutting the tendon 130. The cutting device is configured to fail the tendon 130 by completely cutting the tendon 130. For example, the cutting device may be a known device that cuts an object using laser, water jet or the like.

Alternatively, the fail devices may be a plurality of clamping devices 161 configured to fasten a portion of the tendon 130 so as to allow the tendon 130 to maintain its tension. Once the clamping devices 161 releases the fastening, the tendon 130 is failed.

The plurality of clamping devices 161 may clamp each of the tendons 130 to the hull 110. Once each of the clamping devices 161 is engaged, the tendon 130 corresponding to the engaged clamping device 161 may be fixably supported to the hull 110, and when the clamping device 161 is disengaged, the corresponding tendon 130 may enter a fail state.

The clamping devices 161 may be engaged using, but not limited to, a hydraulic or pneumatic method.

The clamping devices 161 may be provided to clamp corresponding tendons 130 inside the corresponding porch 140, as shown in FIG. 5. For this, the tendon 130 may include a tendon body 131 and an extended part 133 extended upwardly from the tendon body 131. In such a case, the clamping devices 161 may clamp the extended part 133 of the tendon 130 penetrating the porch 140.

The fail device described above is operated by a command by the control part 170 to fail the tendon 130.

The control part 170 controls the operation of the fail part 160 based on the result of measurement by the sensor part 150.

If the control part 170 determines that any one tendon has failed based on the result of measurement by the sensor part 150, the control part 170 instructs another tendon positioned opposite to the failed tendon to fail. The fail instruction of the control part 170 is transferred to the fail device corresponding to the tendon to be failed. The fail device to which fail instruction is transferred fails the tendon to be failed.

In the case where the fail device is the clamping device 161, the control part 170 may control clamping of the clamping device 161 based on the result of measurement by the sensor part 150.

If the control part 170 determines that any one tendon has failed based on the result of measurement by the sensor part 150, the control part 170 releases the clamping of the clamping device corresponding to another tendon positioned opposite to the failed tendon.

The instruction of the control part 170 for releasing of the clamping is transferred to the clamping device 161 corresponding to the tendon 130 subject to the instruction. The clamping device 161 to which instruction is transferred releases the clamping of the tendon 130 to be failed.

The sensor part 150, the fail part 160 and the control part 170 described above balance the position of the hull 110 automatically even if some of the plurality of tendons 130 fail.

The sensor part 150 may further include a tilt sensor 155 configured to measure a trim angle or heel angle of the hull 110. Here, if a value measured by the tilt sensor 155 is greater than a threshold, and a value measured by one of the plurality of tension sensors 151 is smaller than a threshold, the control part 170 may determine that the tendon corresponding to the tension sensor has been failed.

As such, if the tension sensors 151 and the tilt sensor 155 are used together, it is possible to determine more accurately and effectively whether the tendon 130 has been failed or not.

The clamping device 161 may include a plurality of clamping units 161a, 161b, 161c, 161d configured for clamping the corresponding tendon 130. The plurality of clamping units 161a, 161b, 161c, 161d may be arranged by being separated from one another in a longitudinal direction along the same tendon 130.

The control part 170 may sequentially release the clamping of the plurality of clamping units 161a, 161b, 161c, 161d constituting the clamping device 161.

When the clamping is abruptly made to the tendon 130 initially, the hull may be instantaneously shaken in this initial instant. Accordingly, by having the clamping of the plurality of clamping units 161a, 161b, 161c, 161d released sequentially by the control part 170, it is possible to effectively prevent the instantaneous shaking of the hull 110.

The tendon 130 may have a stopper 135 formed thereon. The stopper 135 is configured to prevent the tendon 130 from being detached from the porch 140 formed on the hull 110 when the clamping device 161 is released. For example, stopper 135 may be formed at an upper portion of the tendon 130 penetrating and exposed above the porch 140. The stopper 135 may be configured to be caught by an upper portion of the porch 140. Accordingly, the stopper 135 may prevent the tendon 130 from being detached from the porch 140 downwardly by the weight of the tendon 130 when the clamping device 161 releases the clamping.

Figure 6:
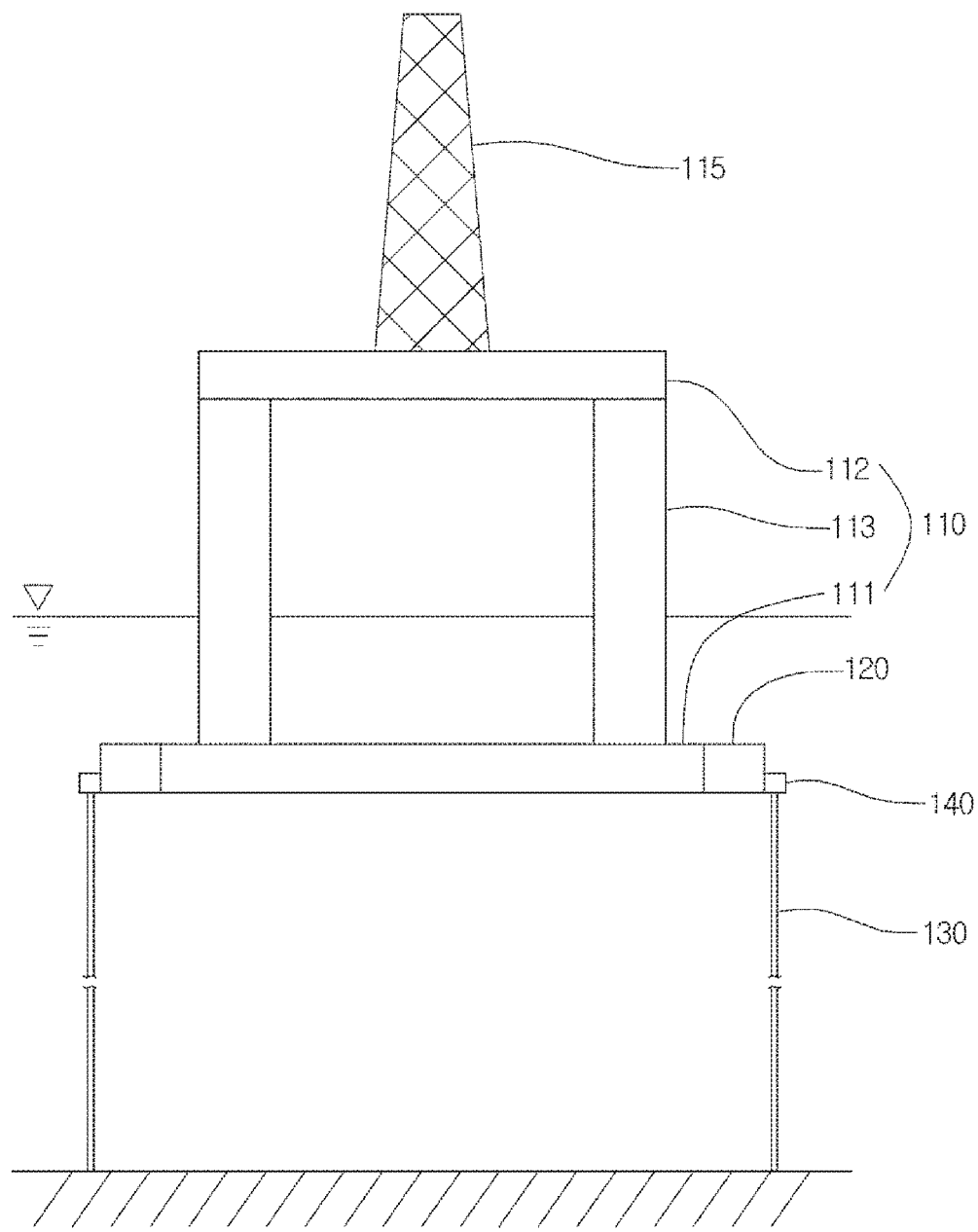
FIG. 6 illustrates a semi-submersible marine structure in accordance with a second embodiment of the present invention.
Figure 7:
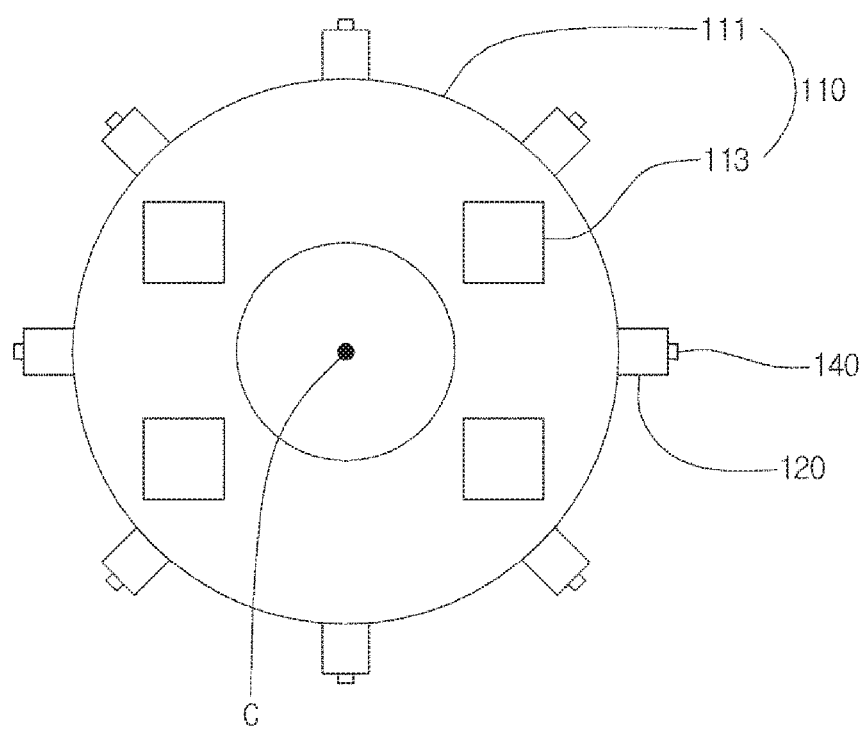
FIG. 7 is a top view of a portion of the semi-submersible marine structure in accordance with the second embodiment of the present invention.

FIG. 6 illustrates a semi-submersible marine structure in accordance with a second embodiment of the present invention, and FIG. 7 is a top view of a portion of the semi-submersible marine structure in accordance with the second embodiment of the present invention. Referring to FIG. 6 and FIG. 7, a semi-submersible marine structure 200 in accordance with the present embodiment includes hull 110, extension member 120 and tendon 130.

The semi-submersible marine structure 200 in accordance with the present embodiment is different from the semi-submersible marine structure 100 (shown in FIG. 1) in accordance with the above-described embodiment in that the tendon 130 is supported to the hull 110 by way of the extension member 120 in the semi-submersible marine structure 200 in accordance with the present embodiment.

The extension member 120 is extended in a lateral direction from the hull 110. For example, the extension member 120 may be extended in a lateral direction from a pontoon 111, as shown in FIG. 6 and FIG. 7.

The extension member 120 may have the shape of a box, in which case the extension member 120 provides additional buoyancy to the hull 110.

The extension member 120 has a porch 140 formed thereon. The porch 140, which is structured to support the tendon 130, may be formed on a lateral surface of the extension member 120.

The extension member 120 is provided in plurality.

In the present embodiment, a plurality of tendons 130 are supported, respectively, to the plurality of extension members 120 in such a way that the plurality of tendons 130 are symmetrical about a center C of the pontoon 111. In such a case, if any one of the plurality of tendons 130 fails, the tendon positioned opposite to the failed tendon may be controlled to fail as well to balance the position of the hull 100.

In the present embodiment, the extension member 120 may be provided in an even number. For example, there may be, but not limited to, 8 extension members 120, as shown in FIG. 7. The even number of extension members 120 are arranged at regular intervals along an external circumferential surface of the pontoon 111 having the circular-ring shape.

Owing to this arrangement, the tendons 130 may be supported, respectively, to the extension members 120 in such a way that the tendons 130 are symmetrical about the center C of the pontoon 111. In such a case, if any one of the plurality of tendons 130 fails, the tendon positioned opposite to the failed tendon may be controlled to fail as well to balance the position of the hull 100.

Figure 8:
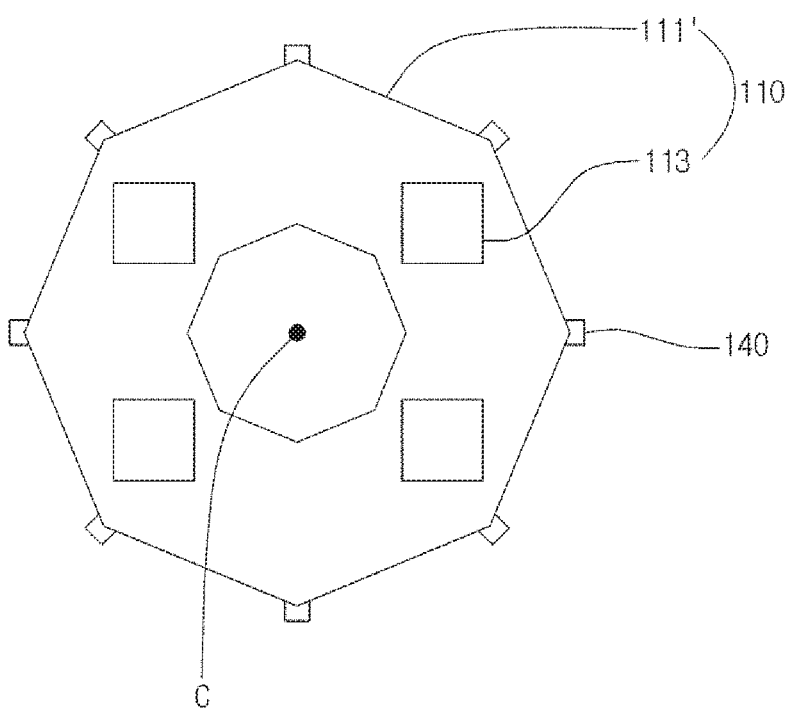
FIG. 8 illustrates a semi-submersible marine structure in accordance with a third embodiment of the present invention.

FIG. 8 illustrates a semi-submersible marine structure in accordance with a third embodiment of the present invention. Referring to FIG. 8, a semi-submersible marine structure 300 according to the present embodiment has a shape of pontoon 111 different from that of the semi-submersible marine structure 100 (shown in FIG. 3) according to the above-described embodiment.

In the present embodiment, the pontoon 111 has the shape of a regular octagonal ring. Accordingly, it is possible for the pontoon 111 to effectively disperse the load applied to the pontoon 111 by external disturbances, thereby effectively minimizing lateral movements of the hull 110. Moreover, since the pontoon 111 is little affected by the direction of the external disturbances and has consistent and predictable behaviors, it is possible to readily control the position of the hull 110

In the present embodiment, a plurality of tendons (not shown) may be arranged, respectively, at corners of the pontoon 111. For this, porches 140 supporting the tendons are arranged, respectively, at the corners of the pontoon 111, as shown in FIG. 8. In such a case, the plurality of tendons may be arranged symmetrically about a center C of the pontoon 111 having the regular octagonal ring shape and arranged at regular intervals.

Figure 9:
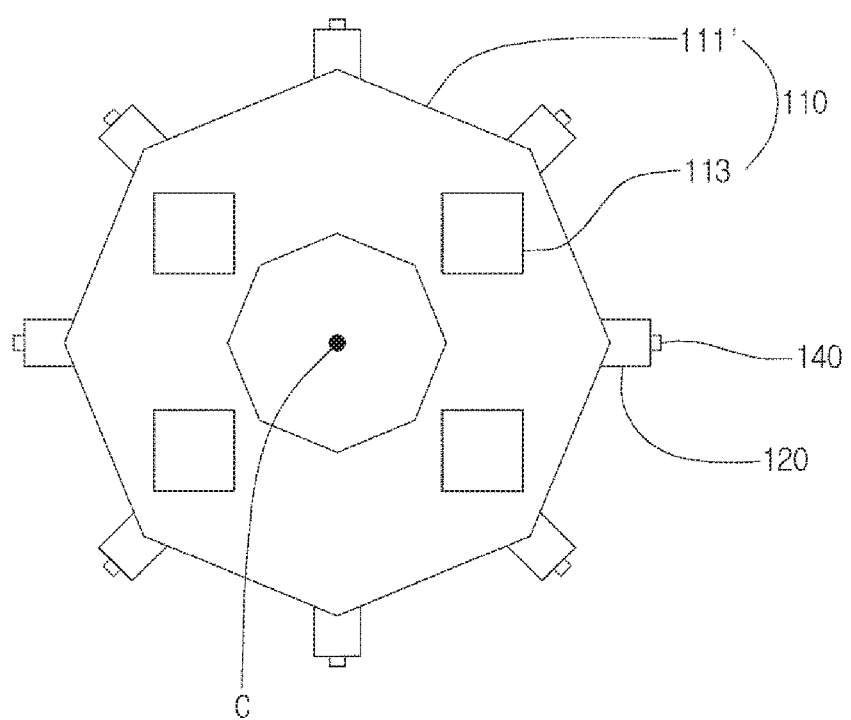
FIG. 9 illustrates a semi-submersible marine structure in accordance with a fourth embodiment of the present invention.

FIG. 9 illustrates a semi-submersible marine structure in accordance with a fourth embodiment of the present invention. Referring to FIG. 9, a semi-submersible marine structure 400 according to the present embodiment has a shape of pontoon 111 different from that of the semi-submersible marine structure 200 (shown in FIG. 7) according to the above-described embodiment.

In the present embodiment, the pontoon 111 has the shape of a regular octagonal ring. Accordingly, it is possible for the pontoon 111 to effectively disperse the load applied to the pontoon 111 by external disturbances, thereby effectively minimizing lateral movements of the hull 110. Moreover, since the pontoon 111 is little affected by the direction of the external disturbances and has consistent and predictable behaviors, it is possible to readily control the position of the hull 110

In the present embodiment, a plurality of extension members 120 are arranged, respectively, at corners of the pontoon 111. In such a case, porches 140, each of which is installed on one lateral surface of each of the extension members 120, may be arranged symmetrically about a center C of the pontoon 111 having the regular octagonal ring shape and at regular intervals. In such a case, tendons (not shown) being supported to the porches 140 may be arranged symmetrically about the center C of the pontoon 111 having the regular octagonal ring shape and at regular intervals.

Although it has been described that the pontoon 111 has the shape of a regular octagonal ring, this is only an example, and it shall be appreciated that the pontoon 111 of the present invention may have any of many various ring shapes having an even number of sides of 10 or more.

Hitherto, certain embodiments of the present invention have been described, but it shall be appreciated by those who are ordinarily skilled in the art to which the present invention pertains that many other various modifications and permutations of the present invention are possible by adding, deleting and/or modifying elements of the present invention without departing from the technical ideas of the present invention that are defined by the claims appended below.

According to embodiments of the present invention, the pontoon having the shape of a circular ring or an even-numbered polygonal ring with 8 or more sides can effectively disperse the load applied to the pontoon by external disturbances in any directions and thus can effectively minimize lateral movements of the hull.

Furthermore, the pontoon having the shape of a circular ring or an even-numbered polygonal ring with 8 or more sides is little affected by the direction of the external disturbances and has consistent and predictable behaviors and thus can readily control the position of the hull.

What is claimed is:

1. A semi-submersible marine structure, comprising:
    a hull comprising a pontoon, a deck disposed above the pontoon, and a plurality of columns supporting the deck from the pontoon;
    a plurality of tendons supporting the hull from a seabed;
    a sensor part configured to measure a fail of each of the plurality of tendons;
    a fail part configured to fail each of the plurality of tendons; and
    a control part configured to control an operation of the fail part based on a result of measuring by the sensor part,
    wherein the plurality of tendons are arranged at regular intervals along an external circumferential surface of the pontoon,
    wherein the fail part comprises a plurality of clamping devices configured to clamp the plurality of tendons, respectively, to the hull, and
    wherein the control part is configured to control clamping of the plurality of clamping devices based on the result of measuring by the sensor part.

2. The semi-submersible marine structure of claim 1, wherein a plurality of extension members are formed on the hull, the extension members extending in a lateral direction and arranged symmetrically with one another, and
    wherein the plurality of tendons are supported by the plurality of extension members, respectively, in such a way that the plurality of tendons are symmetrical with one another.

3. The semi-submersible marine structure of claim 1, wherein, when the control part determines that any one of the plurality of tendons has failed based on the result of measuring by the sensor part, the control part is configured to instruct another of the plurality of tendons positioned opposite to the failed tendon to fail.

4. The semi-submersible marine structure of claim 3, wherein the sensor part comprises a plurality of tension sensors configured to measure a tension of the plurality of tendons, respectively, and
    wherein, when a value measured by one of the plurality of tension sensors is smaller than a threshold, the control part is configured to determine that the tendon corresponding to the tension sensor has failed.

5. The semi-submersible marine structure of claim 4, wherein the sensor part further comprises a tilt sensor configured to measure a trim angle or a heel angle of the hull, and
    wherein, when a value measured by the tilt sensor is greater than a threshold and a value measured by one of the plurality of tension sensors is smaller than the threshold, the control part is configured to determine that the tendon corresponding to the tension sensor has failed.

6. The semi-submersible marine structure of claim 1, wherein, when the control part determines that one of the plurality of tendons has failed based on the result of measuring by the sensor part, the control part is configured to release clamping of one of the clamping devices corresponding to another of the plurality of tendons positioned opposite to the failed tendon.

7. The semi-submersible marine structure of claim 1, wherein each of the plurality of clamping devices comprises a plurality of clamping units, and
    wherein the control part is configured to sequentially release clamping of the plurality of clamping units.

8. The semi-submersible marine structure of claim 1, wherein each of the plurality of tendons has a stopper formed thereon, the stopper being configured to prevent each of the plurality of tendons from being detached from a porch formed on the hull when clamping is released by one of the clamping devices corresponding to the tendon.

* * * * *